United States Patent
Bender et al.

(12)

(10) Patent No.: US 7,037,478 B2
(45) Date of Patent: May 2, 2006

(54) METHOD FOR CONTINUOUS PRODUCING HYDROXYLAMMONIUM SALTS

(75) Inventors: Michael Bender, Ludwigshafen (DE); Hans Jörg Wilfinger, Schifferstadt (DE); Albert Schenkel, Ludwigshafen (DE)

(73) Assignee: BASF Aktiengesellschaft, Ludwigshafen (DE)

(*) Notice: Subject to any disclaimer, the term of this patent is extended or adjusted under 35 U.S.C. 154(b) by 165 days.

(21) Appl. No.: 10/450,113

(22) PCT Filed: Dec. 12, 2001

(86) PCT No.: PCT/EP01/14578

§ 371 (c)(1),
(2), (4) Date: Jun. 11, 2003

(87) PCT Pub. No.: WO02/48031

PCT Pub. Date: Jun. 20, 2002

(65) Prior Publication Data

US 2004/0018136 A1    Jan. 29, 2004

(30) Foreign Application Priority Data

Dec. 14, 2000 (DE) .............................. 100 62 325

(51) Int. Cl.
*C01B 21/087* (2006.01)

(52) U.S. Cl. ........................ 423/387; 423/388
(58) Field of Classification Search ................ 423/387, 423/388
See application file for complete search history.

(56) References Cited

U.S. PATENT DOCUMENTS

| | | | |
|---|---|---|---|
| 2,798,791 A * | 7/1957 | Meier et al. | 423/388 |
| 3,313,595 A | 4/1967 | Jockers et al. | 23/117 |
| 3,856,924 A | 12/1974 | Kartte et al. | 423/387 |
| 4,457,906 A * | 7/1984 | Grosskinsky et al. | 423/387 |
| 4,477,424 A | 10/1984 | Grosskinsky et al. | 423/387 |
| 4,889,704 A * | 12/1989 | Fuchs et al. | 423/387 |
| 4,895,711 A * | 1/1990 | Biffar et al. | 423/387 |
| 5,143,872 A * | 9/1992 | Weiss et al. | 502/25 |
| 5,236,685 A * | 8/1993 | Fuchs et al. | 423/387 |
| 5,320,819 A * | 6/1994 | Mantegazza et al. | 423/387 |
| 5,364,609 A * | 11/1994 | Rouhof et al. | 423/387 |
| 5,554,353 A * | 9/1996 | Schneider et al. | 423/387 |
| 5,792,439 A * | 8/1998 | van Lieshout et al. | 423/387 |

FOREIGN PATENT DOCUMENTS

EP    535514    4/1993

* cited by examiner

*Primary Examiner*—Wayne A. Langel
(74) *Attorney, Agent, or Firm*—Jason D. Voight

(57) ABSTRACT

A process for the continuous preparation of hydroxylammonium salts by catalytic reduction of nitrogen monoxide by means of hydrogen in a dilute aqueous solution of mineral acid in a plurality of reaction stages connected in series comprises
  dividing the incoming stream of dilute aqueous solution of mineral acid into at least two substreams before it is fed into the plurality of reaction stages connected in series,
  feeding a first of these substreams to the first reaction stage,
  feeding a second of these substreams to a reaction stage other than the first, where the inflow of dilute aqueous solution of mineral acid into the plurality of reaction stages connected in series is controlled by means of the pH in this reaction stage other than the first.

6 Claims, No Drawings

METHOD FOR CONTINUOUS PRODUCING HYDROXYLAMMONIUM SALTS

The present invention relates to a process for the continuous preparation of hydroxylammonium salts by catalytic reduction of nitrogen monoxide by means of hydrogen in a dilute aqueous solution of mineral acid in a plurality of reaction stages connected in series, which comprises dividing the incoming stream of dilute aqueous solution of mineral acid into at least two substreams before it is fed into the plurality of reaction stages connected in series, feeding a first of these substreams to the first reaction stage, feeding a second of these substreams to a reaction stage other than the first, where the inflow of dilute aqueous solution of mineral acid into the plurality of reaction stages connected in series is controlled by means of the pH in this reaction stage other than the first.

The continuous preparation of hydroxylammonium salts by catalytic reduction of nitrogen monoxide by means of hydrogen in a dilute aqueous solution of mineral acid in the presence of a suspended noble metal catalyst is a known method and is described, for example, in DE-C-1 177 118. Here, an aqueous solution of mineral acid in which the catalyst is suspended is passed through a plurality of reaction stages connected in series, a mixture of nitrogen monoxide and hydrogen is fed into each reaction stage and catalyst-containing hydroxylammonium salt solution is taken from the last reaction stage. A disadvantage of this process is the formation of undesirable by-products such as dinitrogen monoxide, nitrogen and ammonium salts which leads to a reduction in the yield of hydroxylammonium salt and also leads to explosive mixtures in the case of high dinitrogen monoxide concentrations.

To reduce the formation of by-products in this reaction, EP-B-0 059 366 proposes maintaining a pH of less than 2.0 in the last reaction stage and controlling the inflow of fresh aqueous solution of mineral acid by means of the pH in this last reaction stage. An unsatisfactory aspect of this method is the tendency of the measured parameter (pH in the last reaction stage) and control parameter (inflow of aqueous solution of mineral acid into the first reaction stage) to oscillate, which leads, particularly in the case of high nitrogen monoxide conversions, to losses in yield as a result of by-product formation.

It is an object of the present invention to provide a process which makes possible a technically simple, continuous preparation of hydroxylammonium salts by catalytic reduction of nitrogen monoxide by means of hydrogen in a dilute aqueous solution of mineral acid in a plurality of reaction stages connected in series while avoiding the abovementioned disadvantages.

We have found that this object is achieved by the process defined at the outset.

In general, hydrogen and nitrogen monoxide are employed in a molar ratio of from 1.5:1 to 6:1. Particularly good results are obtained when it is ensured that a molar ratio of hydrogen to nitrogen monoxide of from 1.5:1 to 2.5:1, in particular 2:1, is maintained in the individual reaction stages.

In general, nonreducing strong mineral acids such as perchloric acid, nitric acid, sulfuric acid or phosphoric acid or acid salts such as ammonium hydrogen sulfate or mixtures thereof are used as mineral acid. Preference is given to sulfuric acid or ammonium hydrogen sulfate or mixtures thereof, in particular sulfuric acid.

In general, aqueous solutions of the mineral acid having a concentration of from 4 to 6 normal should be used initially. A decrease in the acid concentration over the reaction stages usually takes place.

The reaction can advantageously be carried out at elevated temperature, preferably at from 30 to 80° C., in particular from 40 to 60° C.

The reaction can generally be carried out at ambient atmospheric pressure or superatmospheric pressure, for example at gauge pressure of up to 10 MPa, preferably up to 5 MPa, in particular up to 3 MPa.

As catalyst for the reduction of the nitrogen monoxide, it is advantageous to use noble metal catalysts, preferably platinum metals, which are generally applied to supports, preferably to carbon, in particular graphite. Platinum on carbon, in particular on graphite, has been found to be particularly useful. The catalysts are employed in finely divided form as a suspension. Such a catalyst preferably contains from 0.2 to 5 percent by weight of platinum. The catalysts advantageously further comprise one or more elements of group 5 of the Periodic Table having an atomic weight above 31, of group 6 of the Periodic Table having an atomic weight above 31 or sulfur-containing compounds as poisoning agents. Suitable catalysts and their preparation are described, for example, in DE-C-1 088 037, DE-C-920 963, DE-C-956 038, DE-C-945 752, EP-0 059 366.

The reaction is carried out in a plurality of reaction stages connected in series. In general, from 2 to 10, preferably from 4 to 8, reaction stages are employed. The reaction stages are advantageously connected so that they communicate with one another.

An aqueous solution of mineral acid in which the catalyst is suspended is advantageously fed to the reaction stages.

According to the present invention, the incoming stream of dilute aqueous solution of mineral acid is divided into at least two, for example two, three or four, preferably two, substreams before it is fed into the plurality of reaction stages connected in series.

According to the present invention, a first of these substreams is fed to the first reaction stage and a second of the substreams is fed to a reaction stage other than the first, preferably to the last reaction stage.

If two substreams are employed, the volume flow ratio of the first of the substreams to the second of the substreams should be in the range from 100:1 to 5:1, preferably from 20:1 to 10:1.

The first of the abovementioned substreams then flows through the individual reaction stages in succession, with the content of hydroxylammonium salt increasing continually with consumption of the acid.

The reaction mixture is taken from the last reaction stage at the same rate at which dilute aqueous solution of mineral acid is fed to the reaction stages.

Advantageously, the reaction stages are each supplied separately with a mixture of nitrogen monoxide and hydrogen, the offgases formed are collected and conveyed, advantageously after at least partial removal of by-products and addition of nitrogen monoxide, to the reaction stages, preferably to the first reaction stage.

According to the present invention, the inflow of dilute aqueous solution of mineral acid into the plurality of reaction stages connected in series is controlled by means of the pH in the reaction stage into which the second of the abovementioned substreams is fed. The measurement of the pH can be carried out in a manner known per se, either continuously, for example by means of appropriate commercially available electrodes, or discontinuously, for example by means of pH paper or pH measurement strips.

The abovementioned pH should advantageously be less than 2, preferably in the range from 0.9 to 1.8. If sulfuric acid is used as mineral acid, a pH in the range from 1.0 to 1.5 has been found to be particularly advantageous.

The control of the abovementioned pH value can be carried out in a technically simple manner by regulating the abovementioned substreams. In an advantageous embodiment, the first substream is kept constant and the abovementioned pH is regulated by means of the second substream.

Hydroxylammonium salts obtained by the process of the present invention are suitable for the preparation of cyclohexanone oxime, a starting compound for the preparation of caprolactam.

We claim:

1. A process for the continuous preparation of hydroxylammonium salts by catalytic reduction of nitrogen monoxide by means of hydrogen in a dilute aqueous solution of mineral acid in a plurality of reaction stages connected in series, which comprises
    dividing the incoming stream of dilute aqueous solution of mineral acid into at least two substreams before it is fed into the plurality of reaction stages connected in series,
    feeding a first of these substreams to the first reaction stage,
    feeding a second of these substreams to a reaction stage other than the first, where the inflow of dilute aqueous solution of mineral acid into the plurality of reaction stages connected in series is controlled by means of the pH in this reaction stage other than the first.

2. A process as claimed in claim 1, wherein a second of the abovementioned substreams is introduced into the last of the reaction stages connected in series.

3. A process as claimed in claim 1, wherein a pH of less than 2 is maintained in the reaction stage into which the second of the abovementioned substreams is fed.

4. A process as claimed in claim 1, wherein the mineral acid used is sulfuric acid.

5. A process as claimed in claim 1, wherein the mineral acid used is sulfuric acid, the second of the abovementioned substreams is fed into the last of the reaction stages connected in series and a pH in the range from 1.0 to 1.5 is maintained in this stage.

6. A process as claimed in claim 1, wherein the volume flow ratio of the first of the substreams to the second of the substreams is form 20:1 to 10:1.

* * * * *